Patented June 4, 1935

2,003,859

UNITED STATES PATENT OFFICE 2,003,859

PREPARATION OF QUINIZARINE

Henry R. Lee, South Milwaukee, Wis., assignor to E. I. du Pont de Nemours & Company, Wilmington, Del., a corporation of Delaware No Drawing. Application January 25, 1934, Serial No. 708,251

5 Claims. (Cl. 260—58)

This invention relates to the preparation of quinizarine and more particularly to the purification of quinizarine whereby the amount of organic solvent insoluble impurities present may be materially reduced.

Quinizarine, when prepared from phthalic anhydride and para-chloro-phenol, as disclosed in U. S. Patent 1,087,412, has been found to contain as high as 8% of solvent insoluble material (chlorobenzene or toluene insoluble). This insoluble material is of such a nature that it renders the quinizarine unsuitable for use in the preparation of certain dyestuffs.

It is the object of the present invention to produce quinizarine substantially free from chlorobenzol insoluble material and suitable for use in the preparation of dyestuffs requiring it in a more pure form than heretofore obtainable by direct precipitation from the condensation mass.

I have found that when quinizarine is prepared by condensing phthalic anhydride with para-chloro-phenol in concentrated sulfuric acid and in the presence of boric acid, it may be obtained directly from the reaction mass in substantially pure form upon careful dilution of such reaction mass to a point where the concentration of the sulfuric acid is between 55 and 70%, based upon the initial charge of sulfuric acid used. The product so isolated may be washed with sulfuric acid of 55 to 70% and the acid cake resludged in boiling water to dissolve soluble impurities such as boric and phthalic acids. The hot solution may then be filtered and the cake washed acid free and dried. It is found that on extraction of the quinizarine thus obtained with chlorobenzene, a solvent insoluble residue of not greater than 2% is obtained.

The following examples are given to more fully illustrate my invention. The parts used are by weight.

Example 1

100 parts of phthalic anhydride, 29 parts of para-chloro-phenol and 25 parts of boric acid are added to 500 parts of 96% sulfuric acid. The mixture is heated at 175–190° C. and held until no further increase in the amount of quinizarine is obtained. The condensation is cooled to from 70 to 100° C. and at this temperature sufficient water is added to bring the sulfuric acid concentration to 58 to 65%, based on initial charge of sulfuric acid. The charge is cooled to 30–40° C., stirred for one hour and filtered on a carborundum filter. The cake is washed with 210 parts of 60% sulfuric acid and finally with 420 parts of cold water. The filter cake is slurried in 2000 parts of water and heated to the boil. The hot solution is diluted with 6000 parts of cold water and filtered. The orange-brown filter cake is washed acid free and dried. The quinizarine so obtained contains not more than 2% of chlorobenzene insoluble material and is suitable for use without further purification for all reactions in which quinizarine is used.

Example 2

A mixture of 224 parts of sulfuric acid (100%), 18.7 parts of boric acid and 49.0 parts of phthalic anhydride are heated to 80° C. and held for thirty minutes to obtain complete solution. 14 parts of para-chloro-phenol are now added and the reaction heated at 190° C. for a period of 16 to 18 hours. The charge is cooled to from 70 to 100° C. and at this temperature sufficient water is added to bring the sulfuric acid concentration to about 58–65%, based on initial charge of sulfuric acid. The temperature is then dropped to 30° C. and the charge filtered. The cake is washed with 100 parts of 60% sulfuric acid and then with 200 parts of cold water. The filter cake is sludged in 1000 parts of water and heated to a boil. The hot solution is diluted with 3000 parts of cold water and filtered. The cake is washed acid free and dried. A substantially pure quinizarine containing only 1 to 2% of chlorobenzene insoluble material is obtained. A product of this purity can be used for all known reactions involving quinizarine.

While in the above examples the quinizarine is purified directly from the condensation mass, it is also contemplated that the quinizarine may be separated in the usual manner from the condensation mass and purified by redissolving it in concentrated sulfuric acid (in the presence of boric acid) and precipitating it therefrom by diluting the acid to 60–65%. The product so obtained may then be washed with acid and water as described in the above examples.

It is known that the proportions of the ingredients used in the preparation of quinizarine as given in the above examples may be varied within wide limits, it being understood of course that the condensation procedure as above described forms no part of the present invention, but is given merely to illustrate my new method for isolating quinizarine in pure form from the usual condensation mass.

While the concentrated acid solution of the quinizarine may be diluted to from 55 to 70% sulfuric acid concentration, based on the initial charge of acid, it is found that dilution to about 65% is the most satisfactory. While concentrations up to 70% sulfuric acid may be used, the yield is reduced in working at these higher acid concentrations. The sulfuric acid loses its solvent action on impurities when too low a concentration is used; and little, if any, improvement is obtained in dilutions below 50 to 55% sulfuric acid. The temperature of the mass during the dilution should not materially exceed 100° C., since tarry products are formed at the higher temperatures. Low temperatures such as 20 to 30° C. may be used, although the temperatures specified in the examples are preferred. The product isolated from 60 to 65% sulfuric acid by the methods as outlined above yields quinizarine containing only from 1 to 2% of chlorobenzene insoluble compounds, as compared to 8% of impurities often found in quinizarine obtained by dropping the condensation mass in water, as described in the prior art.

I claim:

1. The process for purifying quinizarine which comprises precipitating it from a solution in concentrated sulfuric acid by decreasing the concentration of the acid to from 55 to 70%.

2. The process for purifying quinizarine which comprises precipitating it from a solution in concentrated sulfuric acid in the presence of boric acid by decreasing the concentration of the acid to from 58 to 65%.

3. In the preparation of quinizarine wherein phthalic anhydride and para-chloro-phenol are condensed in concentrated sulfuric acid in the presence of boric acid, the step which comprises diluting the condensation mass with sufficient water to bring the sulfuric acid concentration to 55 to 70%, based on the initial charge of sulfuric acid used.

4. In the preparation of quinizarine wherein phthalic anhydride and para-chloro-phenol are condensed in concentrated sulfuric acid in the presence of boric acid, the step which comprises diluting the condensation mass with sufficient water to bring the sulfuric acid concentration to 58 to 65%, based on the initial charge of sulfuric acid used.

5. In the preparation of quinizarine wherein phthalic anhydride and para-chloro-phenol are condensed in concentrated sulfuric acid in the presence of boric acid, the steps which comprise diluting the condensation mass with sufficient water to bring the sulfuric acid concentration to 58 to 65%, based on the initial charge of sulfuric acid used, cooling the mass and filtering therefrom the quinizarine so formed, digesting the same in hot water and separating the purified quinizarine.

HENRY R. LEE.